United States Patent [19]

McLean

[11] Patent Number: 5,303,265

[45] Date of Patent: Apr. 12, 1994

[54] FREQUENCY INDEPENDENT ENCODING TECHNIQUE AND APPARATUS FOR DIGITAL COMMUNICATIONS

[75] Inventor: Peter T. McLean, Colorado Springs, Colo.

[73] Assignee: Digital Equipment Corporation, Maynard, Mass.

[21] Appl. No.: 546,422

[22] Filed: Jun. 29, 1990

[51] Int. Cl.$^5$ .................... H04L 25/34; H04L 25/49
[52] U.S. Cl. ......................... 375/17; 375/19; 375/37; 375/110; 332/106; 329/311
[58] Field of Search ............. 375/17, 19, 20, 37, 375/55, 60, 110, 22; 332/106, 107, 112; 371/56; 370/44; 360/40, 41, 44, 45, 48; 455/608; 341/68; 329/311

[56] References Cited

U.S. PATENT DOCUMENTS

| | | | |
|---|---|---|---|
| 4,083,005 | 4/1978 | Looschen | 375/17 |
| 4,244,051 | 1/1981 | Fujikura et al. | 375/17 |
| 4,271,526 | 6/1981 | Flora | 375/17 |
| 4,280,221 | 7/1981 | Chun et al. | 375/55 X |
| 4,282,601 | 8/1981 | Flora | 375/20 |
| 4,475,212 | 10/1984 | McLean et al. | 375/17 |
| 4,825,450 | 4/1989 | Herzog | 375/55 X |

Primary Examiner—Curtis Kuntz
Assistant Examiner—Tesfaldet Bocure
Attorney, Agent, or Firm—Arnold, White & Durkee

[57] ABSTRACT

A digital communication system using a frequency-independent, high data transmission rate, self-clocking, d.c. balanced data encoding technique. The encoding technique converts two NRZ data bits into a pulse or pulse-pair. The form of the pulse or pulse-pair representing the encoded data bit-pair depends upon the average d.c. level of the previously transmitted pulses. Each pulse of a pulse-pair has a fixed width. The receiver is activated by the leading edge of a transmitted pulse-pair and samples the pulse-pair at points in time determined by the known fixed width of the pulses. The sampled pulse-pairs are then converted into NRZ data bit-pairs. Proper functioning of the receiver does not rely upon the rate upon which the data is transferred. A high data rate is achieved by encoding two bits of data in every pulse or pulse-pair transmitted.

15 Claims, 11 Drawing Sheets

| CNT 1 | CNT 0 | BIT A | BIT B | NEXT CNT 1 | NEXT CNT 0 |
|---|---|---|---|---|---|
| 0 | 0 | 0 | 0 | 0 | 0 |
| 0 | 0 | 0 | 1 | 1 | 1 |
| 0 | 0 | 1 | 0 | 0 | 1 |
| 0 | 0 | 1 | 1 | 0 | 0 |
| 0 | 1 | 0 | 0 | 0 | 1 |
| 0 | 1 | 0 | 1 | 0 | 0 |
| 0 | 1 | 1 | 0 | 1 | 1 |
| 0 | 1 | 1 | 1 | 0 | 1 |
| 1 | 1 | 0 | 0 | 1 | 1 |
| 1 | 1 | 0 | 1 | 0 | 1 |
| 1 | 1 | 1 | 0 | 0 | 0 |
| 1 | 1 | 1 | 1 | 1 | 1 |

| CNT 1 | CNT 0 | BIT A | BIT B | POS PULSE | NEG PULSE |
|---|---|---|---|---|---|
| 0 | 0 | 0 | 0 | P2 | P1 |
| 0 | 0 | 0 | 1 | "NP" | P1 |
| 0 | 0 | 1 | 0 | "NP" | P3 |
| 0 | 0 | 1 | 1 | P1 | P2 |
| 0 | 1 | 0 | 0 | P2 | P1 |
| 0 | 1 | 0 | 1 | "NP" | P1 |
| 0 | 1 | 1 | 0 | P1 | "NP" |
| 0 | 1 | 1 | 1 | P1 | P2 |
| 1 | 1 | 0 | 0 | P2 | P1 |
| 1 | 1 | 0 | 1 | P3 | "NP" |
| 1 | 1 | 1 | 0 | P1 | "NP" |
| 1 | 1 | 1 | 1 | P1 | P2 |

| P1 POS | P2 POS | P2 NEG | BIT A | BIT B |
|---|---|---|---|---|
| 0 | 0 | 0 | 0 | 1 |
| 0 | 0 | 1 | 1 | 0 |
| 0 | 1 | 0 | 0 | 0 |
| 0 | 1 | 1 | X | X |
| 1 | 0 | 0 | 1 | 0 |
| 1 | 0 | 1 | 1 | 1 |
| 1 | 1 | 0 | 0 | 1 |
| 1 | 1 | 1 | X | X |

Fig. 15

FREQUENCY INDEPENDENT ENCODING TECHNIQUE AND APPARATUS FOR DIGITAL COMMUNICATIONS

FIELD OF THE INVENTION

This invention generally relates to digital communications and, more particularly to data encoding techniques for frequency-independent transmission of digital information.

BACKGROUND OF THE INVENTION

In the field of data encoding techniques for the transmission of digital information it is advantageous to have a single receiving component accept data from transmitters with different transmission frequencies (frequency-independence), to attain a high data transmission rate, to eliminate the d.c. component of a transmitted data signal (d.c. balancing), and to avoid the need for sending separate clocking signals or information between portions of the system (self-clocking). Frequency-independent encoding techniques enable the use of data transmitters with differing transmission rates without the necessity of replacing the receiving component of the data transmission system. Transmitted data which is encoded using a frequency independent encoding technique permits the receiver to accept data from transmitting devices having different transmission rates as long as the transmission rate of the transmitter does not exceed the maximum rate of the receiver. In the field of storage of digital data and in particular in the use of memory disk controllers, frequency independent data encoding techniques are especially attractive due to the varying retrieval rates of different memory devices. In addition the evolving technology in this field has developed new data memory devices with higher data rates. Therefore, a receiver that can accept data at diverse data transmission rates is usable with both the old and the new data retrieval technology.

Data encoding techniques for use in data transmission systems typically attempt to minimize the number of transitions in signal level per bit transmitted. Since transmission media have known bandwidth limits, decreasing the number of transitions per bit transmitted increases the maximum rate at which data can be transmitted over a given medium. In known data frequency independent encoding techniques, each bit transmitted requires reservation of a time period equivalent to two pulse periods. A pulse period is the time necessary for a signal to change from a neutral state to a valid logic level and back again to the neutral state. The necessity of having two pulse periods for every transferred data bit limits the performance of high-speed data communication devices. Data encoding techniques accordingly seek to minimize the number of pulses required per bit transferred and thus decrease the effect of transmission media bandwidth limits which limit the maximum data transmission rate.

The elimination of the d.c. component of the signal enables a.c. coupling of the transmission media to the source and receiver of the digital data by means of a transformer. The use of a transformer or a.c. coupling avoids problems caused by differences in the ground potentials between the transmission source and receiver of the digital data.

Most Self-clocking data encoding techniques permit two units in a data transmission system to communicate without separate clocking information or a separate clocking signal. The nature of the transmitted data stream allows the receiver to generate an associated clock signal without prior knowledge that the data has been transmitted.

Known data encoding techniques have been unable to incorporate all four of these desirable objectives in a single encoding technique. Accordingly the developers of data communication networks have been required to choose between encoding techniques that encompass some, but not all, of the above referred advantageous features.

SUMMARY OF THE PRESENT INVENTION

The present invention is a data encoding technique for use in a digital communication system. The data encoding technique achieves d.c. balancing, allows transmission of data at a rate of one bit per pulse period, is self-clocking and frequency-independent.

In the preferred embodiment, bit-pairs of binary data in NRZ form are encoded and transmitted as a pulse or pulse-pair. The pulses are a fixed width known by both the transmitter and receiver. The interval between pulse-pairs can vary with the rate at which the pulse-pairs are transmitted. The transmitted pulse or pulse-pair is received, decoded, and transformed back into two separate bits of data in NRZ form. The encoding technique of the present invention achieves a doubling of the maximum bit rate attainable in known digital data transmission encoding techniques which required an allocation of time equal to a pulse-pair for each transmitted bit.

The leading edge of each transmitted pulse or pulse-pair activates a sampling circuit in the receiving device. The sampling circuit then samples the pulse or pulse-pair and stores the polarity in data latches at predetermined points in time based on the known pulse width. The sampling circuit comprises a clocking circuit and a plurality of flip-flops. The clocking circuit responds to the leading edge of the transmitted pulse or pulse-pair and generates two clock signals. The first clock signal activates a first edge triggered D flip-flop which stores the polarity of the first pulse of the received pulse or pulse-pair. The second clock signal activates a second edge triggered D flip-flop which stores the polarity of the second pulse if the encoded bit-pair is a pulse-pair. A decoder circuit receives the polarity information stored in the D flip-flops and generates a data bit-pair corresponding to the original data bit-pair. Since the sampling circuit is activated by the reception of the encoded data itself and otherwise remains inactive, the sampling is self-clocking and frequency independent. The clock signal is generated when data is received and the receiver need not have prior knowledge of the rate at which the pulse-pairs are transmitted.

In the encoding technique of the present invention d.c balancing is achieved through the selective transmission of a pulse or pulse-pair having a neutral, negative or positive average voltage. A counter receives a data bit-pair and provides an output indicative of the relative number of positive and negative pulses previously transmitted. The d.c balancing facilitates a.c. coupling of the transmission media to the receiver and transmitter. The use of a.c. coupling of the transmission media avoids problems caused by differences in the ground potentials between the source and receiver of the digital signal.

The encoded signal, represented by a single pulse or a pulse-pair, is constructed from three basic pulses. P1 is the first pulse transmitted in a pulse-pair. P2 is the second pulse transmitted in a pulse pair when the polarities of the first and second pulse are opposite. If the polarity of the first and second pulses are the same, then a third pulse, P3 is transmitted. The beginning of the third pulse coincides with the beginning of the first pulse, and the ending of the third pulse coincides with the end of the second pulse. The third pulse is transmitted instead of the first and second pulse in order to guarantee transmission of a glitch-free encoded pulse-pair.

In the preferred embodiment, six distinct pulses or pulse-pairs represent the four possible binary bit-pair combinations, namely 00, 01, 10, and 11. When the first encoded signal consists of P1 being transmitted with a negative polarity and P2 with a positive polarity. The encoded form of the second bit-pair combination, 01, depends upon the pulse counter value. If the counter value is 0 or +1, then the encoded form of the binary data bit-pair consists of P1 being transmitted with a negative polarity; otherwise, if the counter's value is −1, then P3 is transmitted with a positive polarity. The data bit-pair combination 10 also depends upon the counter's value. If the counter value is −1 or 0, then the encoded form of the binary data bit-pair 10 consists of P1 being transmitted with a positive polarity; otherwise, if the counter's value is +1, then P3 is transmitted with a negative polarity. The encoded form of the fourth bit-pair combination, 11, consists of P1 being transmitted with a positive polarity and P2 with a negative polarity.

Each of the binary bit-pair combinations is assigned to a particular encoded signal or set of signals. It is within the scope of the present invention to assign the four possible binary bit-pair combinations to different ones of the respective pulse or pulse-pair encoding states without affecting the performance of the digital data transmission system. Thus, the data encoding technique of the present invention permits any one of the above bit-pairs to be associated with any one of the four classifications of encoded states.

DETAILED DESCRIPTION

Figure 1:
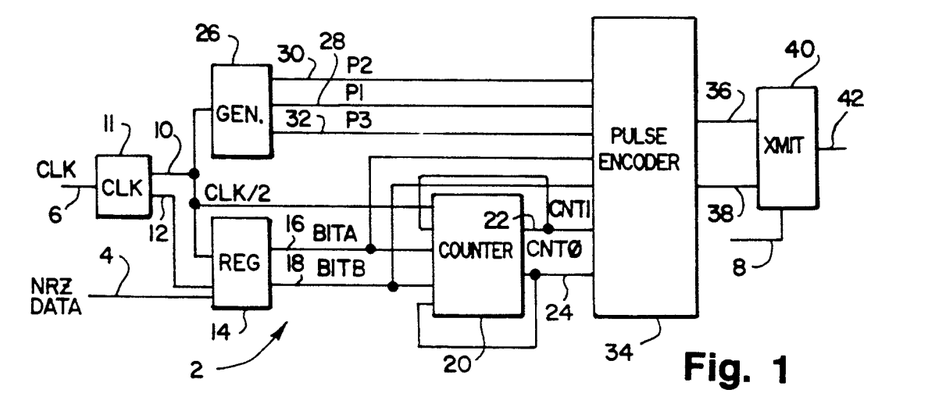
FIG. 1 shows a block diagram of the transmitter of a data communication system.

Referring to the drawings, wherein the reference characters designate like or corresponding parts throughout the views, FIG. 1 shows the transmitter 2 of a data communication system. The inputs to transmitter 2 are serial non-return to zero data (NRZ data) on line 4, a clock signal on line 6 and an enabling signal on line 8. Lines 4 and 6 are labeled NRZ DATA and CLK respectively in the timing diagram in FIG. 5. The input clock signal on line 6 is received by clock circuit 11 comprising a D flip-flop and is converted into a half-frequency clock signal on line 10 and a complemented half-frequency clock signal on line 12. Line 10 is labeled CLK/2 in the timing diagram in FIG. 5. The serial NRZ data input on line 4 is received by an input data register 14. As is well known, input data register 14, described more fully hereinafter, comprises two D flip-flops in parallel and one staging D flip-flop to achieve serial to parallel conversion of two data bits. The input data register 14 also receives the clocking signals on lines 10 and 12, and converts the serial NRZ data input on line 4 into bit-pairs by storing the serial data received on line 4 in the parallel D flip-flops. Input data register 14 has a first output on 16 and a second output on line 18. The data outputs on line 16 and on line 18 are the data bit-pair. Lines 16 and 18 are labeled BIT A and BIT B respectively in the timing diagram in FIG. 5. The data bit-pair on lines 16 and 18 are received by a pulse encoder 34 and a counter 20.

The data bit-pair on lines 16 and 18 and the half-frequency clock signal on line 10 are received by the counter 20. The counter 20 generates a first output signal on line 22 and a second output signal on line 24. The outputs on lines 22 and 24 represent the state of the counter 20, and are received by the pulse encoder 34 to determine the form of the encoded digital data. The outputs on lines 22 and 24 are also fed back as inputs to the counter 20 to determine the next state of the counter 20. The first and second outputs on lines 22 and 24 represent the relative number of positive pulses transmitted in comparison to the number of negative pulses transmitted. Lines 22 and 24 are labeled CNT 1 and CNT 0 respectively in the timing diagram in FIG. 5. The counter 20 is more fully described hereinafter.

A pulse generator 26 receives the half-frequency clock signal on line 10. The pulse generator 26 supplies three output pulses: P1 on line 28, P2 on line 30 and P3 on line 32. The three output pulses, P1, P2 and P3, are used to construct the encoded data signal. The waveforms of P1, P2 and P3 are shown in the timing diagram in FIG. 5. The detailed description of the pulse generator 26 is set forth hereinafter.

A pulse encoder 34 receives the bit-pair signal from the input data register 14 on lines 16 and 18, the state of the counter 20 on lines 22 and 24, and the basic pulses P1, P2, and P3 on lines 28, 30 and 32 respectively. The pulse encoder 34 outputs are on line 36 and line 38. The output signals on line 36 and line 38 are positive and negative components of the encoded digital data bit-pair. Lines 36 and 38 are labeled POS PULSE and NEG PULSE respectively in the timing diagram in FIG. 5. The form of the encoded pulse is determined by the bit-pair data on lines 16 and 18, and the counter 20 outputs on lines 22 and 24. The pulse encoder 34 selects the components of the data signal according to the encoding technique for encoding the binary data bit-pair as described more fully hereinafter.

A pulse transmitter 40 receives the positive component of the encoded digital signal on line 36 and the negative component of the encoded digital signal on line 38. The enabling/disabling signal on line 8 enables the pulse transmitter 40 when data is ready to be transmitted and disables the pulse transmitter 40 when a valid data signal is not present. The pulse transmitter 40 produces a data signal for transmission on transmission line 42. Line 42 is labeled BUS DATA in the timing diagram in FIG. 5. In the preferred embodiment the transmission line 42 is a coaxial cable, however, any other well known transmission medium can be used.

D.c. balancing is achieved by the combined operation of the counter 20, pulse generator 26, the encoding scheme executed by pulse encoder 34 and the pulse transmitter 40. The counter 20 output on lines 22 and 24 represents the relative number of positive pulses transmitted in comparison to the number of negative pulses transmitted. The net polarity of the encoded signal is selected by the pulse encoder 34 such that the difference between the number of positive pulses transmitted in comparison to the number of negative pulses transmitted never exceeds one.

The combination of a first and second pulse of opposite polarities must have no net d.c. component, and the combination of two single pulses of a polarity opposite that of the third pulse must have no net d.c. component. Therefore, the duration of the first and second pulses generated by the pulse generator 26 must be equal and the duration of the third pulse must be twice the duration of the first or second pulse. Furthermore, the magnitude of positive and negative pulses transmitted on transmission line 42 must be equal.

Figure 2:
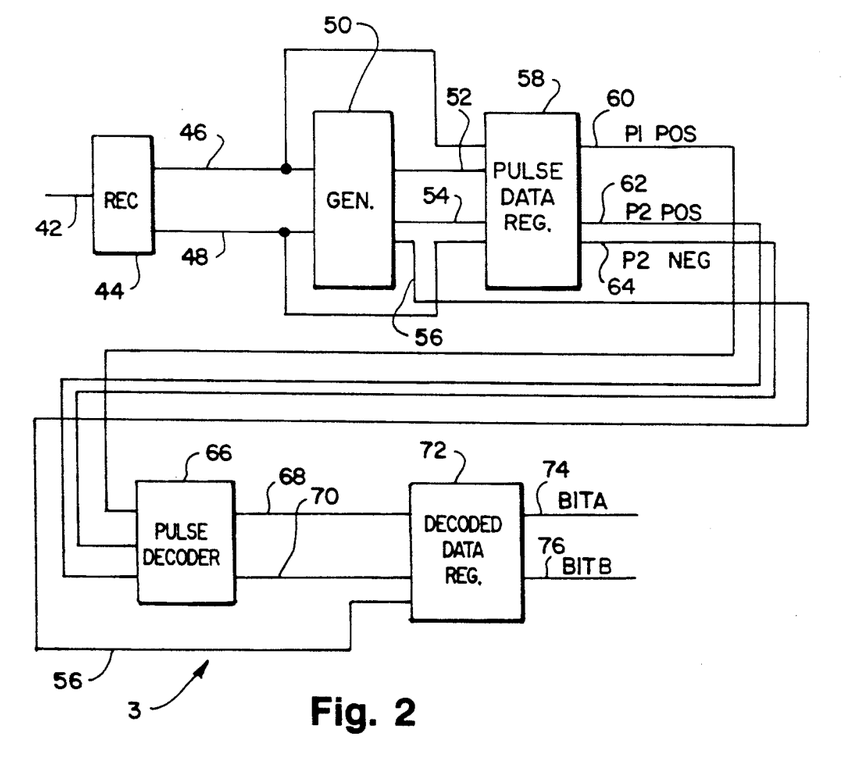
FIG. 2 shows a block diagram of the receiver of a data communication system.

FIG. 2 shows receiver circuit 3 of a data communication system. A pulse receiver 44 receives the transmitted data signal from the transmission line 42 and separates the positive and negative components of the received pulses. The positive and negative components are output on lines 46 and 48 respectively. The outputs of the pulse receiver 44 on lines 46 and 48 are connected to a sample generator 50 and a pulse data latch 58.

The sample generator 50 receives the positive and negative components of the received signal on lines 46 and 48. The outputs of the sample generator 50 are a first sample signal on line 52 and a second sample signal on line 54. The sample generator 50 output signals on lines 52 and 54 are used by a pulse data register 58 for storing the polarity of a first and second received pulse respectively. The sample generator 50 also generates the complemented output of the second sample signal on line 56. The complement of the second sample signal activates the D flip-flops in a decoded data register 72.

The pulse data register 58 receives the positive and negative components of the received pulse on lines 46 and 48 respectively. The polarity of the first received pulse is stored in an edge triggered D flip-flop activated by the sample signal on line 52. The polarity of the second pulse is stored in D flip-flops activated by the sample signal on line 54. The outputs of the pulse data register 58 are the polarity of the first pulse on line 60 and the polarity of the second pulse on lines 62 and 64. The pulse data on lines 60, 62, and 64 provide information necessary for decoding the pulse or pulse-pair into an NRZ data bit-pair. The pulse data register 58 is described in greater detail hereinafter.

A pulse decoder 66 receives the pulse data information on lines 60, 62 and 64. The output of the pulse decoder 66 on lines 68 and 70 is the decoded bit-pair in NRZ form. The pulse decoder 66 converts the pulse polarity data contained on input lines 60, 62 and 64 into NRZ data. The decoded output of the pulse decoder 66 contained on lines 68 and 70 is then stored in the decoded data register 72. The output of the decoded data register 72 on lines 74 and 76 represents the values of the bit-pair originally present on lines 16 and 18 of the input data register in FIG. 1.

Figure 3:
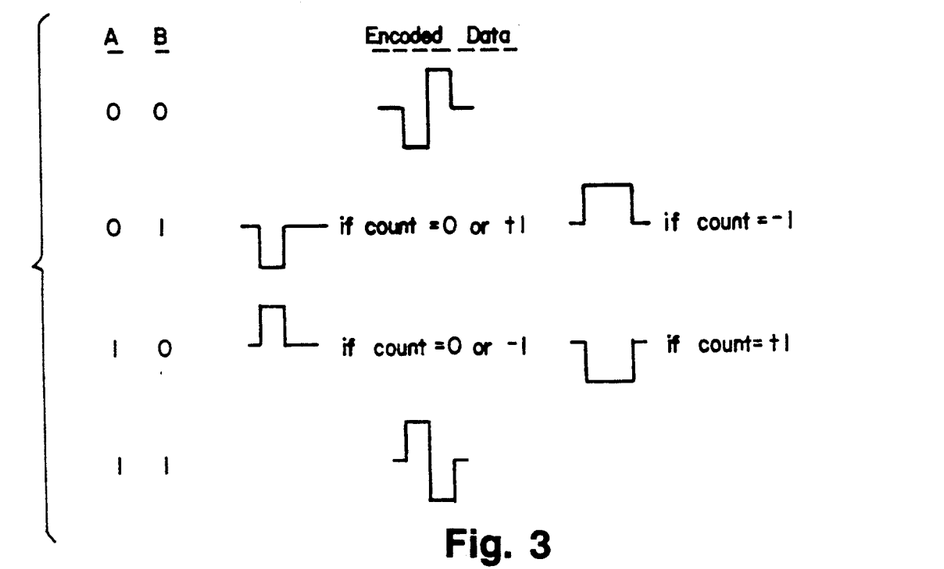
FIG. 3 shows the for possible bit-pair combinations and the encoded waveform(s) for each bit-pair combination.

FIG. 3 illustrates the four possible bit-pair combinations and their encoded waveforms. If the binary data bit-pair on lines 16 and 18 of FIG. 1 is "00", then the first pulse is of negative polarity and the second pulse is of positive polarity. If the binary data bit-pair on lines 16 and 18 of FIG. 1 is "01", then if the output of the counter 20 on lines 22 and 24 of FIG. 1 (i.e., the count value) is 0 or +1 then the first pulse is of negative polarity and there is no second pulse, otherwise the first and second pulses are both of positive polarity. If the binary data bit-pair on lines 16 and 18 of FIG. 1 is "10", then if the count value is 0 or −1 then the first pulse is of positive polarity and there is no second pulse, otherwise the first and second pulses are both of negative polarity. If the binary data bit-pair on lines 16 and 18 of FIG. 1 is "11", then the first pulse is of positive polarity and the second pulse is of negative polarity.

The encoding technique shown in FIG. 3 allows data to be transmitted at a rate of one pulse per data bit. This enables data to be transmitted at a rate twice the rate of known data encoding techniques. It is within the scope of the present invention to include multiple bits or bit sets and not just bit pairs. The encoding technique would be altered to accommodate the number of bits in the bit set and would be within the ordinary ability of one skilled in the art.

Figure 4:
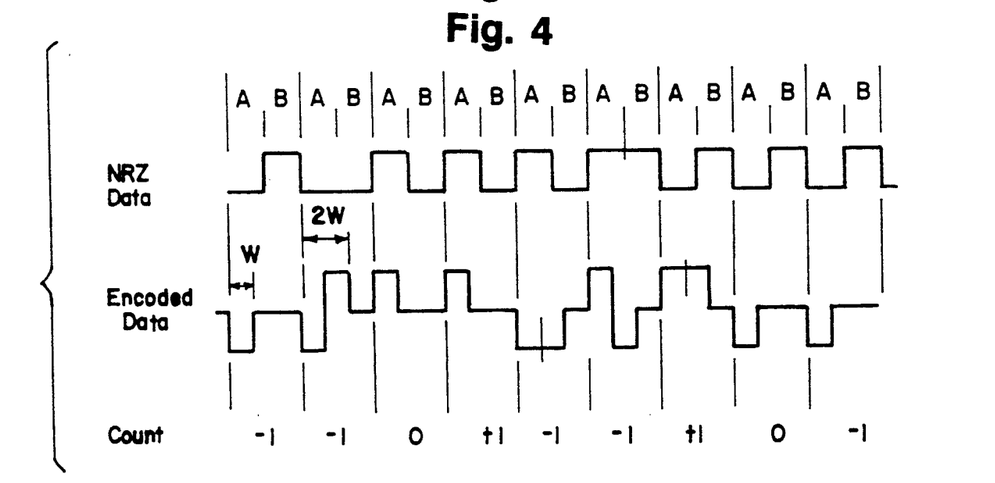
FIG. 4 illustrates the encoding technique.

FIG. 4 illustrates a waveform generated by the encoding technique of the present invention. NRZ data represents the unencoded serial data input on line 4. The count value in FIG. 4 is decimal value of the two's complement output of counter 20 on lines 22 and 24. The encoded data represents the signal transmitted on transmission line 42 and follows the encoding scheme described in FIG. 3. Each pulse is present for a fixed time (w), and each pulse-pair is transmitted in fixed time equal to twice the single pulse width.

Figure 5:
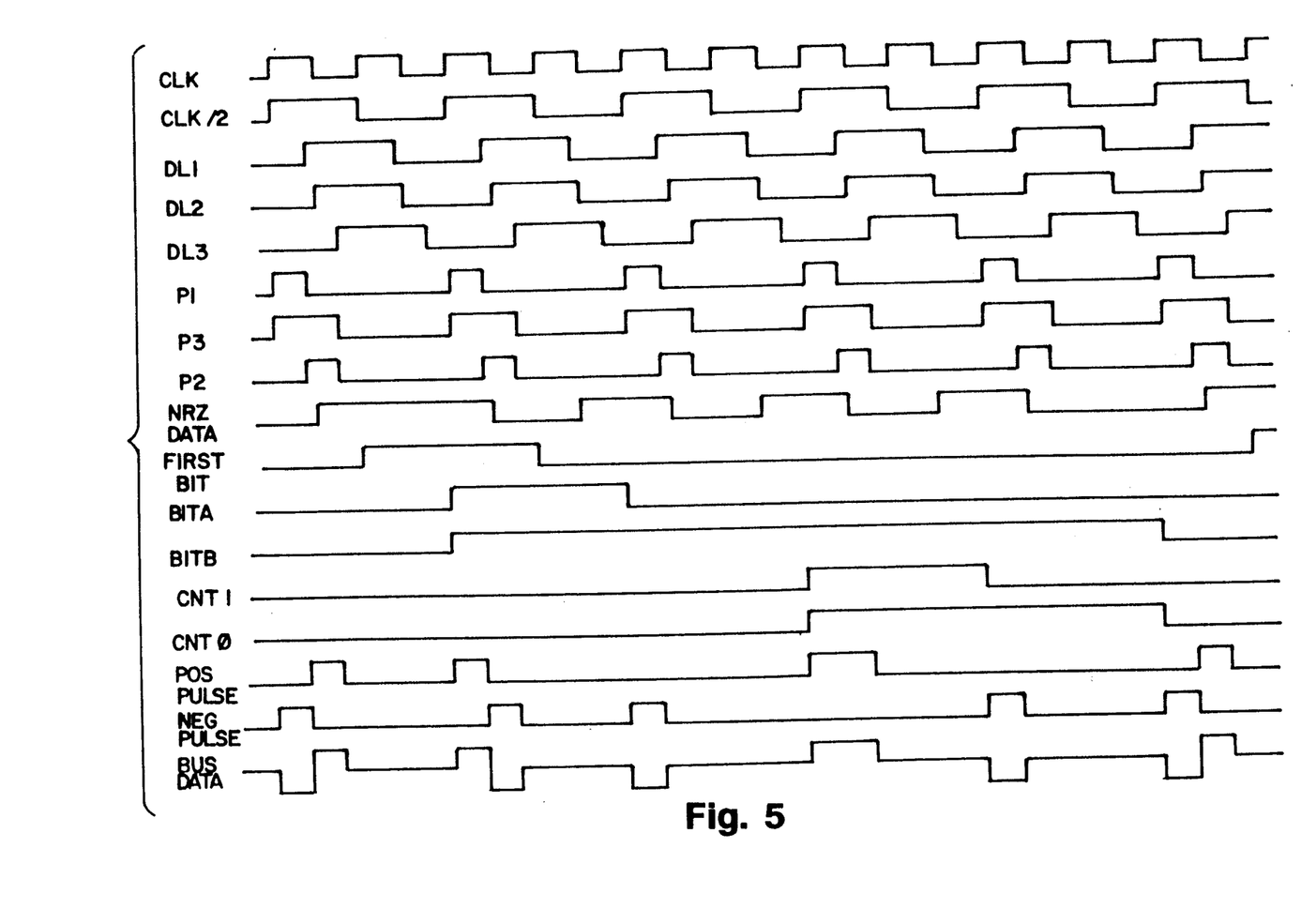
FIG. 5 is an illustrative timing diagram for the input, encoder and transmission circuits of the transmitter.

The timing diagram of FIG. 5 illustrates hypothetical input and output signals of the circuits comprising the transmission circuit 2 shown in FIG. 1. The purpose and function of these signals are described more fully when the individual components are described hereinafter.

Figure 6:
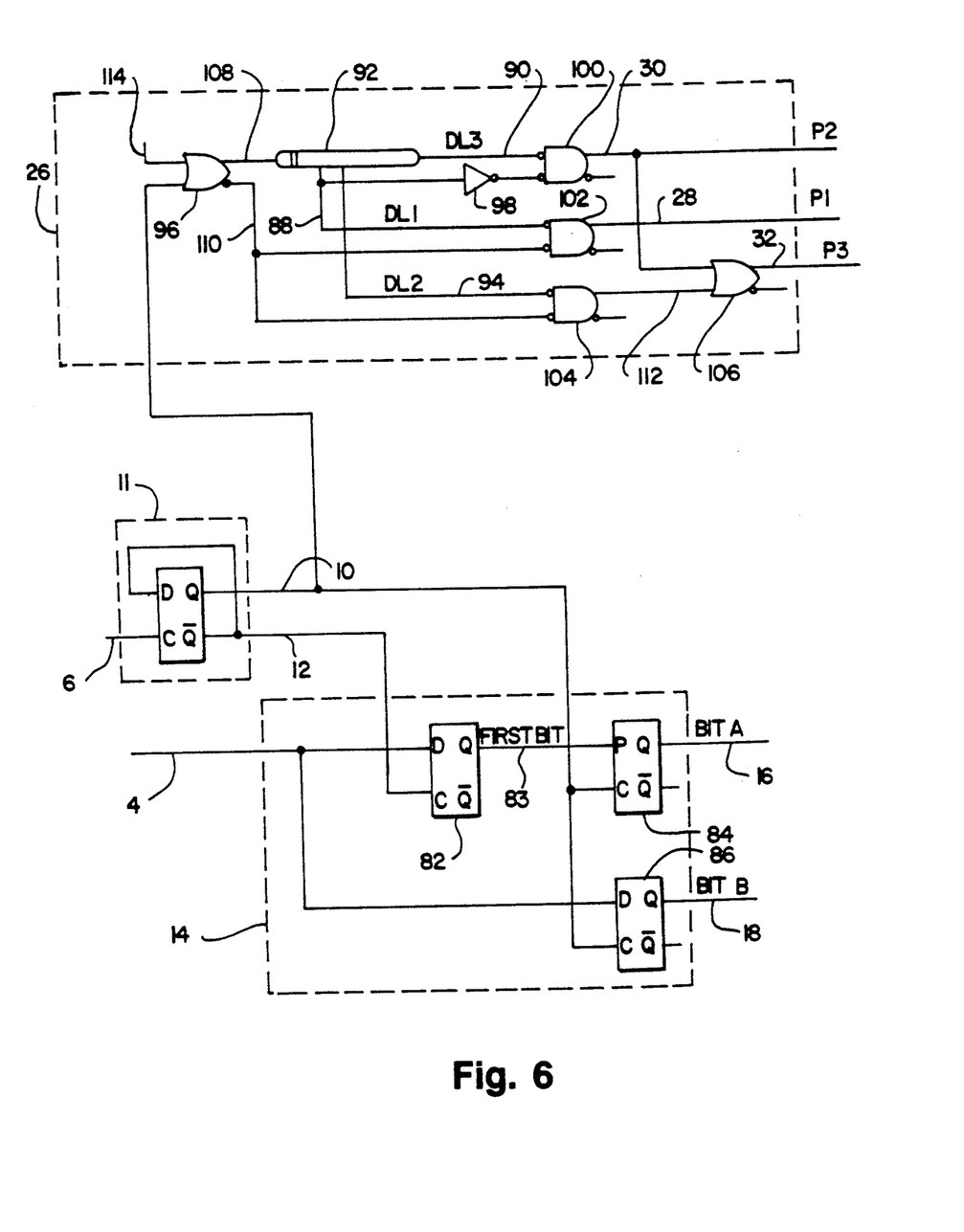
FIG. 6 is the logic diagram of the input circuit and the pulse generator circuit of the transmitter.

FIG. 6 shows the details of the input portion of transmitter 2 including the clock circuit 11, the pulse generator 26 and the input data register 14. The input clock signal on line 6 is received by D flip-flop and converted into a half-frequency clock signal on line 10 and a complemented half-frequency clock signal on line 12. The input data register 14 comprises a delay flip-flop 82, and data flip-flops 84 and 86. The delay flip-flop 82 and the data flip-flops 84 and 86 convert serial input data from line 4 into two-bit parallel data. Specifically, in the first half of a clock cycle of the half-frequency clock, the first data bit is stored in D flip-flop 82 when the complemented clock signal on line 12 makes a low to high transition. In the second half of a half-frequency clock cycle, the half-frequency clock signal on line 10 makes a low to high transition. At this point, the second data bit is stored in D flip-flop 86 and the first data bit on line 83 is stored in D flip-flop 84. After signal 10's low to high transition, the outputs of D flip-flops 84 and 86 on lines 16 and 18 hold the valid values of the data bit-pair. The data bit-pair on lines 16 and 18 will remain valid until the next low to high transition of the half-frequency clock signal on line 10. Lines 83, 16 and 18 are labeled FIRST BIT, BIT A and BIT B respectively in the timing diagram in FIG. 5.

In a preferred embodiment, pulse generator 26 receives an input clock signal on line 10 and generates a first pulse on line 28, a second pulse on line 30, and a third pulse on line 32. The second pulse on line 30 begins at the completion of the first pulse and lasts for the same period of time as the first pulse. The third pulse on line 32 begins with the first pulse and ends with the end of the second pulse. Lines 88 and 90, attached to delay line 92, transmit signals which mark the end of the first and second pulses respectively. Line 94 transmits a signal which is delayed for a period shorter than DL3 on line 90 but greater than DL1 on line 88. This signal prevents glitches in the double-length third pulse transmitted on line 32. Lines 88, 94 and 90 are labeled DL1, DL2 and DL3 respectively in the timing diagram in FIG. 5.

The preferred embodiment of the pulse generator 26 is shown in FIG. 6. An OR/NOR gate 96 receives the clock signal on line 10. The other input of the OR/NOR gate 96 is disabled. The OR output on line 108 is received by a delay line 92. The delay line 92 output on line 88 is received by the inverted input of AND/-NAND gate 102 and the input of inverter 98. The output of inverter 98 is connected to the inverted input of AND/NAND gate 100. The delay line 92 output on line 94 is received by the inverted input of AND/-NAND gate 104. The delay line 92 output on line 90 is received by the inverted input of AND/NAND gate 100. The NOR output of OR/NOR gate 96 on line 110 is received by the inverted inputs of AND/NAND gates 102 and 104. The AND output of gate 104 is connected to OR/NOR gate 106. The AND output of gate 102 on line 28 carries the first pulse signal. The AND output of gate 100 on line 30 carries the second pulse signal. An OR/NOR gate 106 receives the second pulse signal on line 30. The OR output of gate 106 carries the third pulse signal on line 32.

Figure 7:
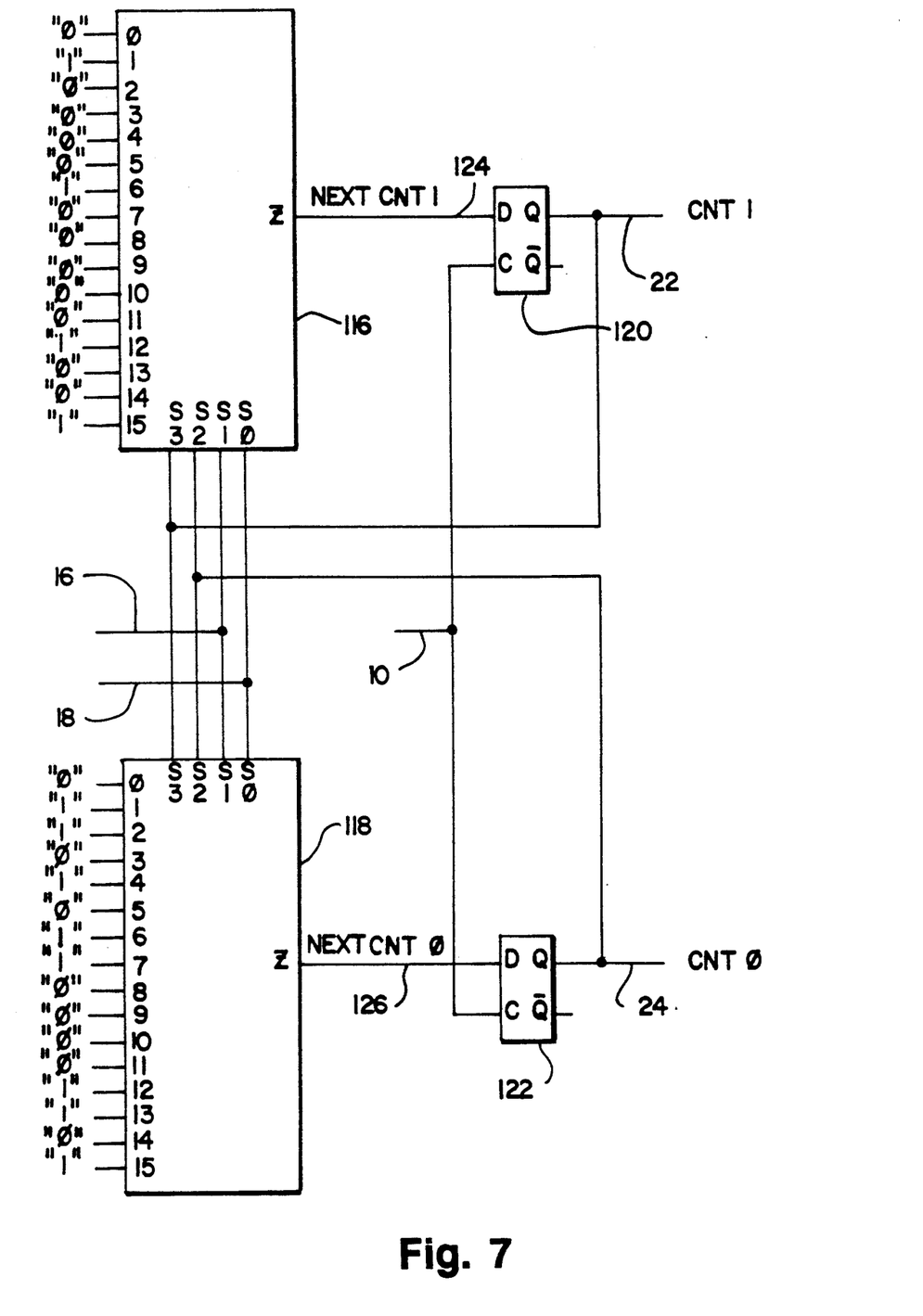
FIG. 7 is a logic diagram of the counter circuit of the transmitter.
Figure 8:
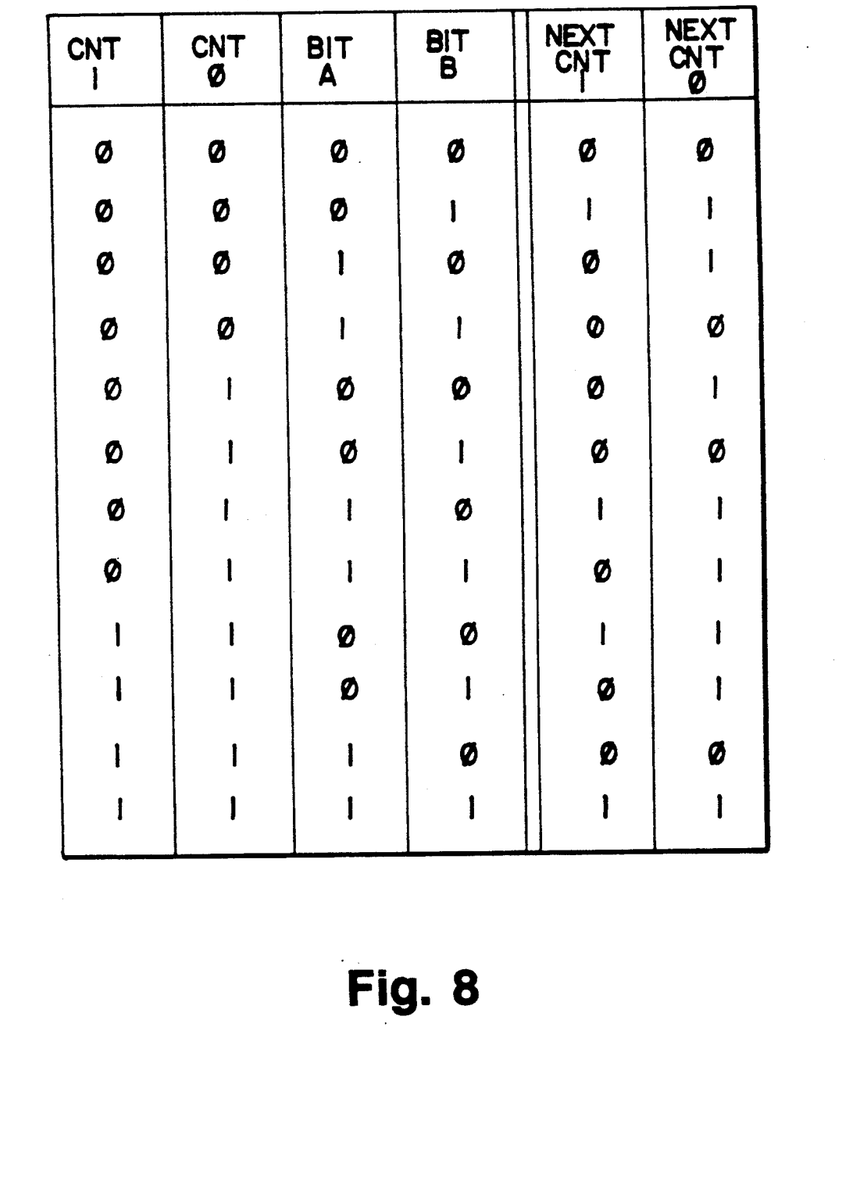
FIG. 8 is a truth table for the counter circuit.

FIG. 7 shows the preferred embodiment of the counter 20 of FIG. 1. The counter 20 comprises 16 to 1 multiplexers 116 and 118. The data bit-pair on lines 16 and 18 and the current state of the counter 20 on lines 22 and 24 control the output of multiplexers 116 and 118 on lines 124 and 126 respectively. The signals on lines 124 and 126 are the next value of the counter. The value of the signals on lines 124 and 126 are stored in D flip-flops 120 and 122 when the next low to high transition of the clock signal on line 10 occurs. The inputs to the multiplexers are connected to either logic "0" or logic "1". The connections are summarized in the truth table in FIG. 8. In the preferred embodiment counter 20 comprises multiplexers 116 and 118 however, it is within the scope of the present invention to use logic gates in place of multiplexers 116 and 118. Either logic gates or multiplexers 116 and 118 could be used to implement the input logic to flip-flops 120 and 122 without substantially altering the operation of the counter circuit 20. The function of counter 20 is to track the relative number of positive pulses transmitted in comparison to the number of negative pulses transmitted.

Figure 9:
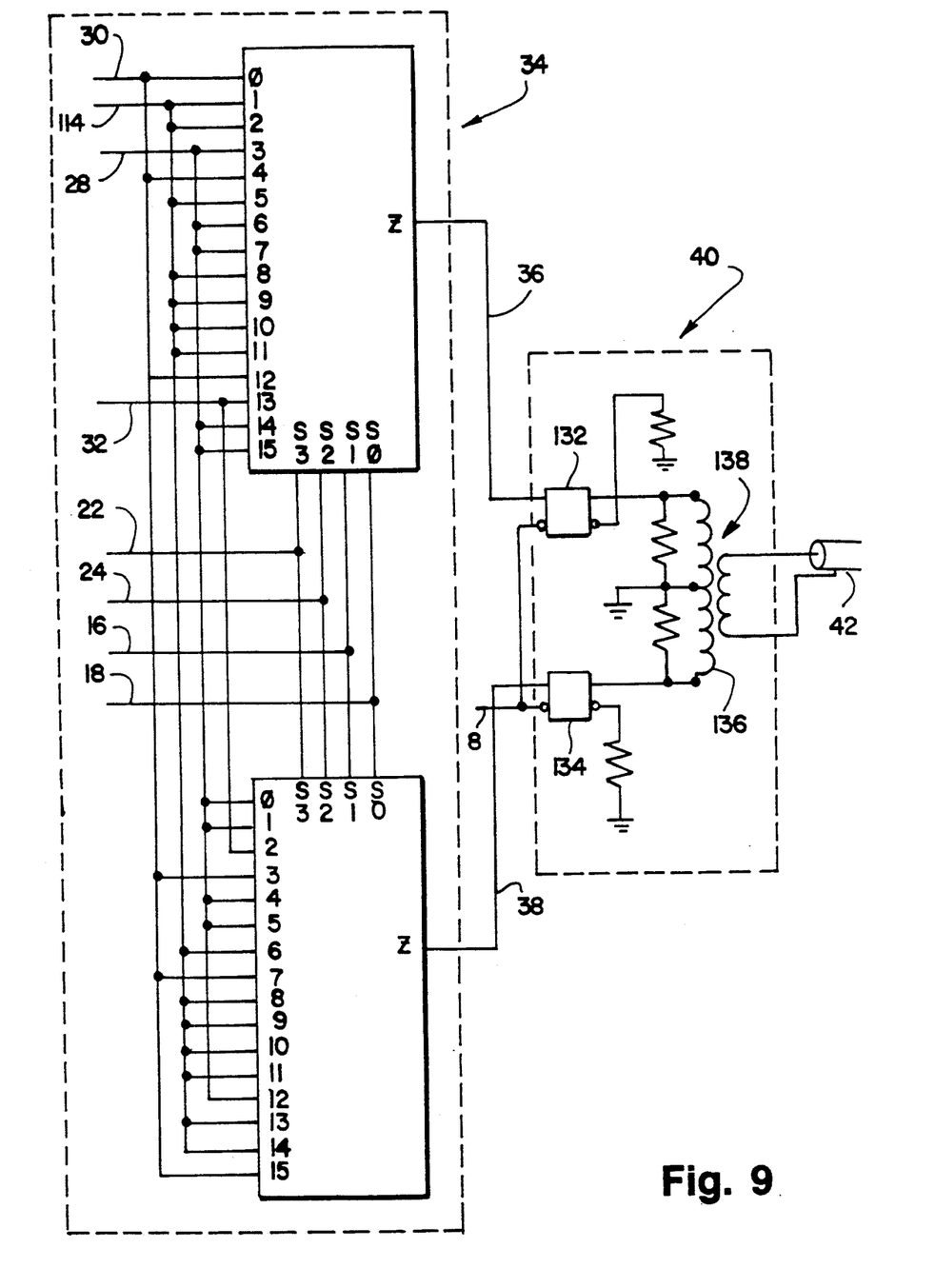
FIG. 9 is a schematic/logic diagram of the signal generation circuit for encoding and transmitting the data.
Figure 10:
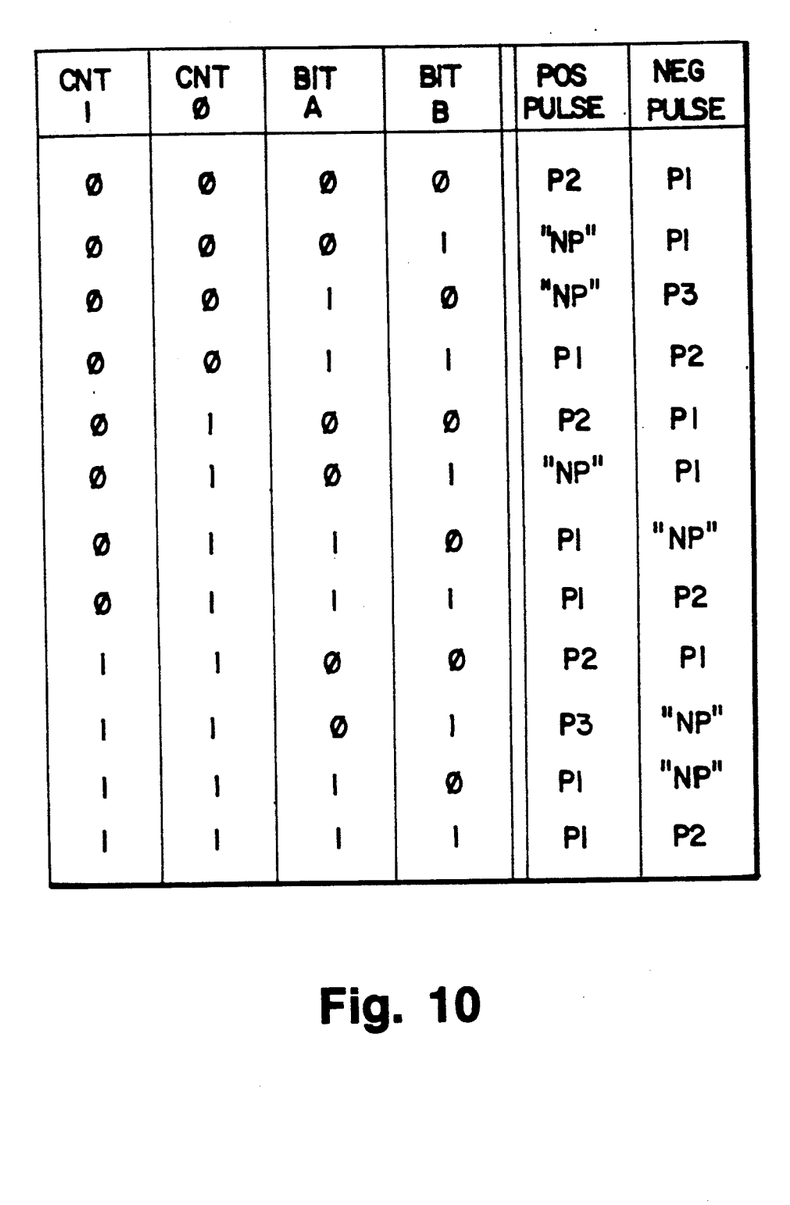
FIG. 10 is a truth table for one embodiment of the encoding technique.

FIG. 9 shows the preferred pulse encoder 34 and pulse transmitter 40 of FIG. 1. The pulse encoder 34 comprises 16 to 1 multiplexers 128 and 130 which are controlled by lines 16, 18, 22 and 24. Lines 16 and 18 carry the bit-pair data from the input register 14. Lines 22 and 24 carry the output signals from the counter 20. Lines 16, 18, 22, and 24 selectively route the pulses on lines 28, 30, and 32, or no pulse on line 114 through multiplexers 120 and 130 as shown in FIG. 9 and summarized in the truth table in FIG. 10 wherein the designation "NP" refers to no pulse. The outputs of multiplexers 128 and 130 on lines 36 and 38 are connected to current sinking line drivers 132 and 134 respectively. Line drivers 132 and 134 are well known and commonly used in the area of data communication.

When enabled by a control signal on line 8, the pulse transmitter 40 receives the encoded digital signal in the form of positive pulses on line 36 and negative pulses on line 38. The encoded signal is transmitted onto transmission line 42 by means of a transformer network. When a positive pulse is to be transmitted, driver 132 is momentarily activated by the selected pulse on line 36 and current passes through the upper half of primary winding 136 of transformer 138 and creates a positive pulse on transmission line 42. When a negative pulse is to be transmitted on transmission line 42, driver 134 is momentarily activated by the selected pulse on line 38 and current flows through the lower half of primary winding 136 of transformer 138 and a negative pulse is transmitted on transmission line 42.

Figure 11:
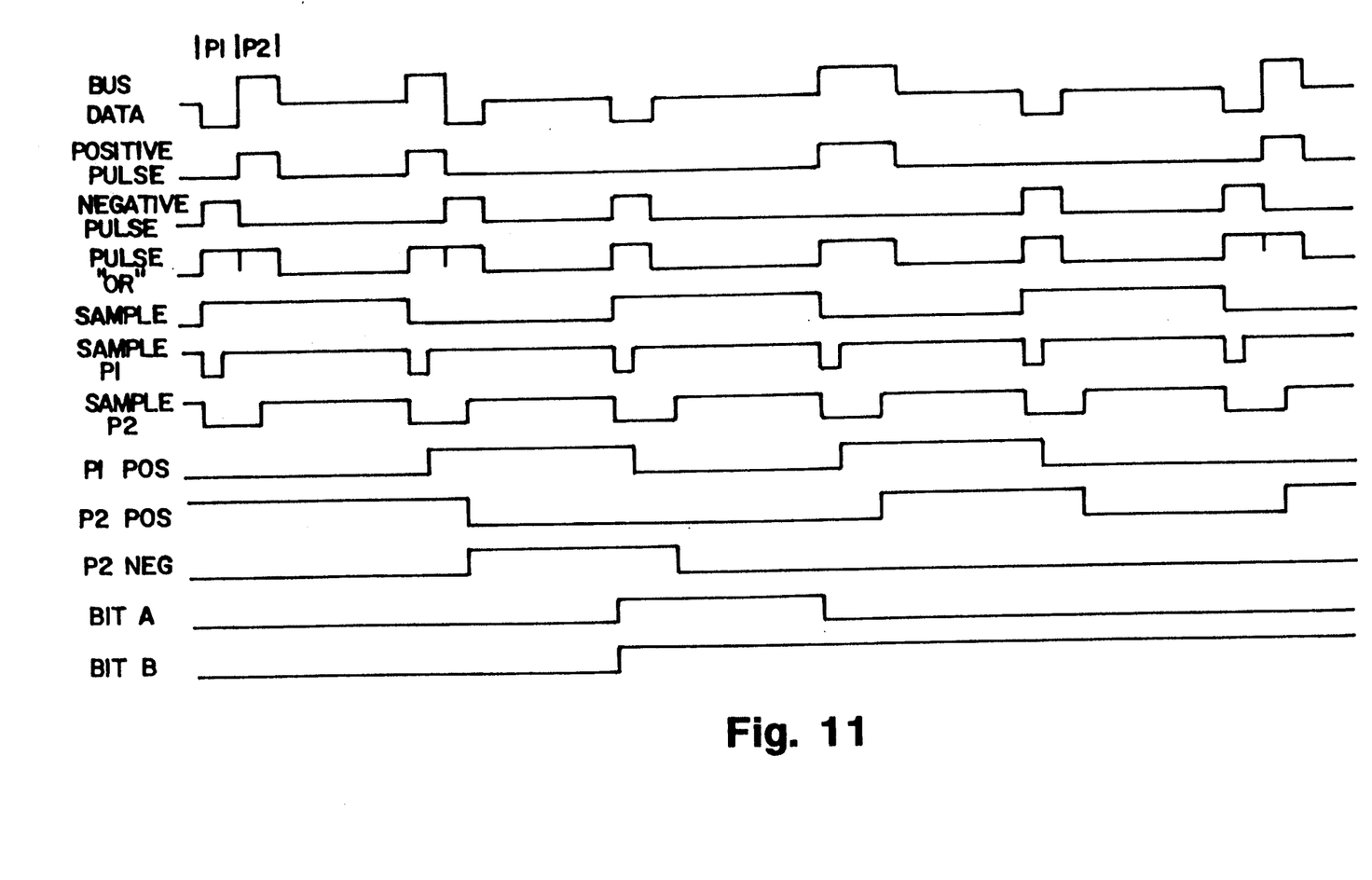
FIG. 11 is an illustrative timing diagram for the receiver, decoder and storage circuits of the receiver.

The timing diagram of FIG. 11 illustrates hypothetical bus data received on transmission line 42 and corresponding control and output signals generated by the circuits comprising the receiver circuit 3 shown in FIG. 2. The purpose and function of these signals is described more fully when the individual components are described hereinafter.

Figure 12:
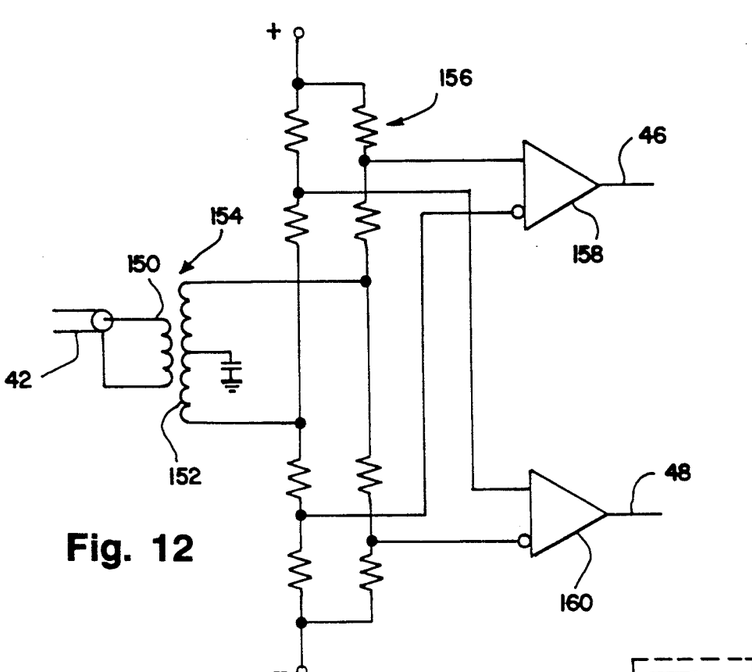
FIG. 12 is a schematic diagram of the receiver circuit.

FIG. 12 shows the preferred receiver circuit 44 for the communication system shown in FIG. 2. The transmission line 42 is terminated at primary winding 150 of transformer 154. Transmission line 42 is labeled BUS DATA in the timing diagram in FIG. 11. In order to achieve proper termination of the transmission line (impedance matching) and proper signal input levels, secondary winding 152 of transformer 154 is connected to line receivers 158 and 160 by resister network 156. Output line 46 of line receiver 158 transmits a positive pulse in response to the reception of a positive pulse at receiver circuit 44. Output line 48 of line receiver 160 transmits a positive pulse in response to the reception of a negative pulse at receiver circuit 44. Lines 46 and 48 are labeled POSITIVE PULSE and NEGATIVE PULSE respectively in the timing diagram in FIG. 11.

Figure 13:
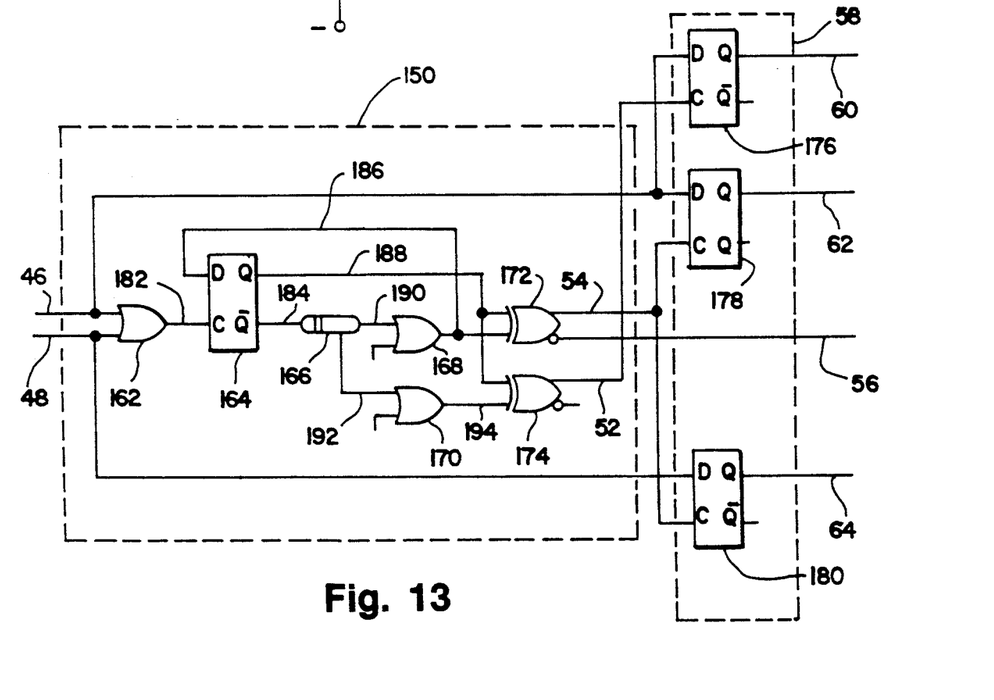
FIG. 13 is a logic diagram of the part of the decoder circuit which detects and stores the polarity of detected signals.

FIG. 13 shows the preferred embodiment of a self-clocking and frequency independent circuit for storing the polarity characteristics of the received signal in a data transmission system. The sample generator 50 is activated by the reception of a pulse at OR gate 162 from either line 46 or line 48. When activated, the sample generator 50 transmits three signals. The first signal, on line 52, makes a low to high transition while the pulse data register 58 is receiving the first pulse of an encoded bit-pair on line 46 or line 48. The second signal, on line 54, makes a low to high transition while the Pulse Data Register 58 is receiving the second pulse of an encoded bit-pair on line 46 or line 48. The third signal, on line 56, is the complement of the second signal. This signal clocks the decoded data register 72. The preferred embodiment of the sample generator 50 is shown in FIG. 13.

The lines 46 and 48 are the inputs to OR gate 162. The output of OR gate 162 on line 182 is received by the clock input of positive edge triggered D flip-flop 164. Line 182 is labeled PULSE 'OR' in the timing diagram in FIG. 11. The data output of flip-flop 164 on line 188 is connected to the inputs of XOR/XNOR gates 172 and 174. Line 188 is labeled SAMPLE in the timing diagram in FIG. 11. The inverted output of D flip-flop 164 on line 184 is connected to delay line 166. The output of delay line 166 on line 192 is connected to the input of OR gate 170. The other output of delay line 166 on line 190 is connected to OR gate 168. The other inputs of OR gates 168 and 170 are disabled. The output of OR gate 170 on line 194 is connected to XOR/XNOR gate 174. The XOR output of gate 174 on line 52 is connected to the clock input of D flip-flop 176. Line 52 is labeled SAMPLE P1 in the timing diagram in FIG. 11. The output of OR gate 168 on line 186 is connected to the data input of D flip-flop 164 and also the input to XOR/XNOR gate 172. The XOR output of gate 172 on line 54 is connected to the clock inputs of D flip-flops 178 and 180. Line 54 is labeled SAMPLE P2 in the timing diagram in FIG. 11. The XNOR output of gate 172 on line 56 is connected to the clock inputs of D flip-flops 200 and 202 in FIG. 14.

The D flip-flops 176, 178 and 180 of the pulse data register 58 receive the polarity of the encoded data bit-pair pulses on lines 46 and 48. The pulse data register 58 also receives clock signals on lines 52 and 54. Focusing upon D flip-flop 176, a positive pulse is stored when line 52 makes a low to high transition. As explained above, this signal makes a low to high transition when the first pulse of the encoded data bit-pair is valid at the input to D flip-flop 176. The output of D flip-flop 176 on line 60 is connected to pulse decoder 66. Line 60 is labeled P1 POS in the timing diagram in FIG. 11. Line 54 carries a sampling signal which clocks D flip-flops 178 and 180. Line 54 makes a positive transition, thus latching input signals on lines 46 and 48 received by D flip-flops 178 and 180 respectively, when the polarity of the second pulse of a pulse-pair should be valid on line 46 or line 48. After line 54 makes a low to high transition the outputs of D flip-flops 178 and 180, on lines 62 and 64 respectively, hold the polarity of the second pulse of a pulse-pair. Lines 62 and 64 are labeled P2 POS and P2 NEG respectively in the timing diagram in FIG. 11. If the second pulse is positive, then output line 62 will be high. If the second pulse is negative, then output line 64 will be high. If there is no second pulse, then neither line 62 nor 64 will be high. Lines 62 and 64 are connected to pulse decoder 66. The sample generator 50 and the pulse data register 58 are activated by the encoded data rather than a clocking signal. This is the advantage referred to earlier as self-clocking. Since the sample generator 50 and the pulse data register 58 are activated by the leading edge of a pulse or pulse-pair representing an encoded data bit-pair, the frequency with which the transmitter circuit transmits each encoded data bit-pair is irrelevant to the operation of the sample generator 50 and the pulse data register 58. Thus, frequency-independence is achieved.

Delay line 166 in FIG. 13 is chosen so that a positive signal transition is generated on line 52 when the polarity of the first pulse is valid on line 46. Delay line 166 is also chosen so that a positive signal transition is generated on line 54 when the polarity of the second pulse is valid on lines 46 and 48. The delay values for delay line 166 are determined by the pulse widths of the transmitted pulse pair. The pulse widths must be both known and fixed because sampling of the first pulse must occur before the polarity of the first pulse is no longer valid on line 46, and sampling of the second pulse must occur after the second pulse's polarity has become valid on line 46 or 48 and before the second pulse's polarity is no longer valid on line 46 or 48.

Figure 14:
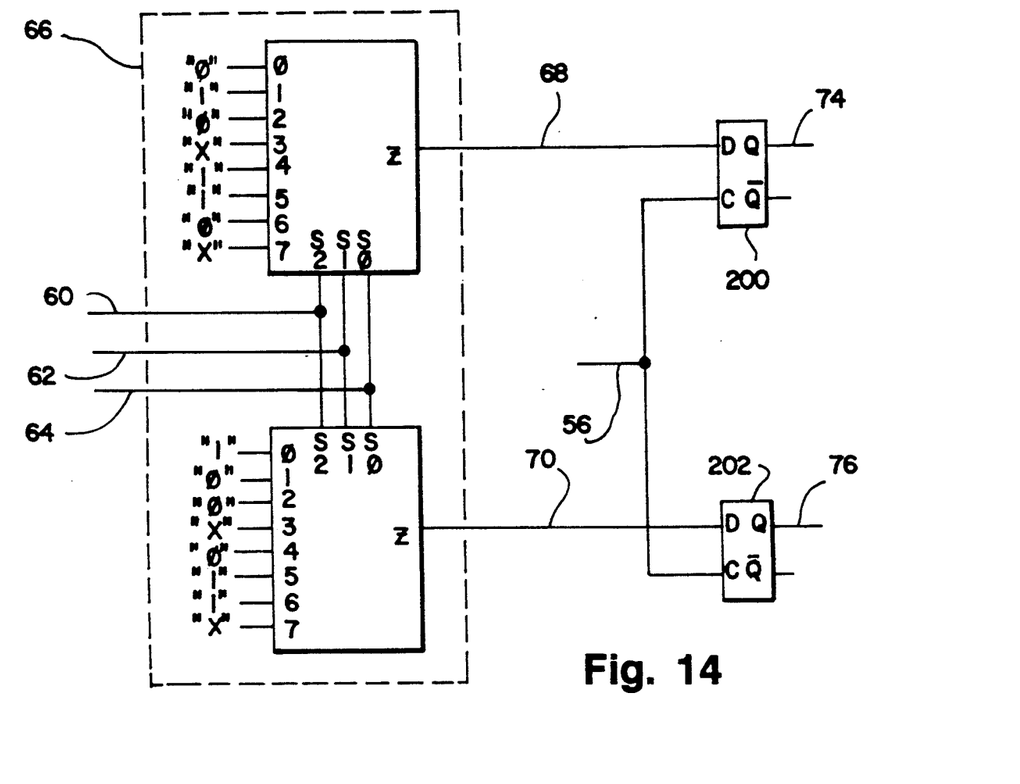
FIG. 14 is a logic diagram of the part of the decoder circuit which transforms the pulse data into the decoded digital data and stores the digital data as two data bits in NRZ form.
Figure 15:
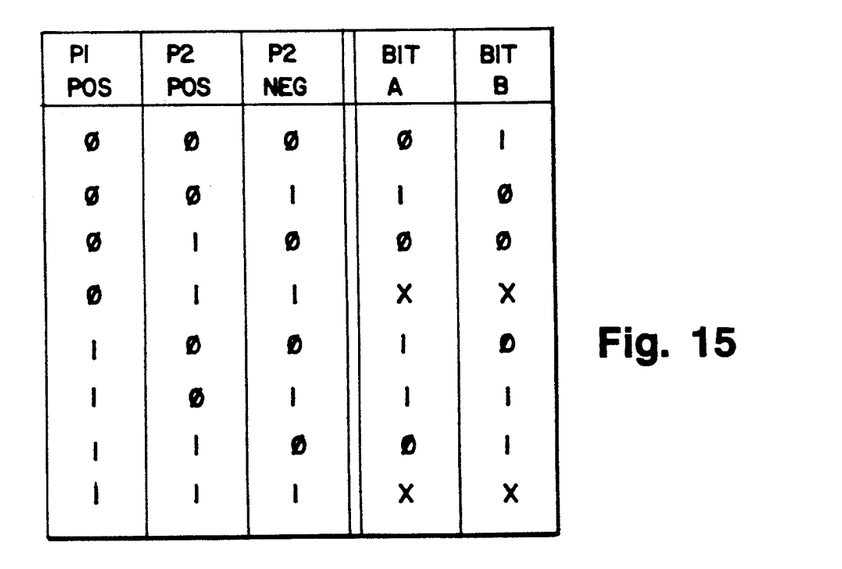
FIG. 15 is a truth table for the multiplexers of FIG. 10.

FIG. 14 shows the preferred circuit for pulse decoder 66, the circuit for converting the pulse information into NRZ data bit-pairs. The pulse decoder 66 receives the pulse-pair polarity data on lines 60, 62, and 64. The lines 60, 62, and 64 comprise the select signals for multiplexers 196 and 198. The inputs to the multiplexers are connected to logic high or low according to the truth table in FIG. 15. Multiplexers are used—though individual gates could be used in the place of the multiplexers. The outputs 68 and 70 of multiplexers 196 and 198 represent the decoded NRZ values of the data bit-pair. The signals on lines 68 and 70 are received by D flip-flops 200 and 202 respectively. The outputs 74 and 76 of D flip-flops 200 and 202 become valid when line 56, transmitting a clocking signal generated by the sample generator 50, makes a low to high transition. This transition occurs when the next pulse or pulse-pair is received at the sample generator 50. Lines 74 and 76 are labeled BIT A and BIT B respectively in the timing diagram in FIG. 11. The outputs 74 and 76 of the D flip-flops 200 and 202 are the decoded NRZ data originally present at outputs 16 and 18 of positive edge triggered D flip-flops 84 and 86 in FIG. 6.

Thus, there has been described herein a data encoding technique and the implementing apparatus which is frequency-independent, has a high data transmission rate, is d.c. balanced and is self-clocking. It will be understood that various changes in the details, arrangements and configurations of the parts and system which have been described and illustrated above in order to explain the nature of the present invention may be made by those skilled in the art within the principle and scope of the present invention as expressed in the appended claims:

I claim:

1. A digital communication system for receiving data bit sets and encoding each bit set in to a pulse set, the number of bits in each bit set being equal to or greater than the number of pulses in each pulse set and each of the pulses in a pulse set having a fixed width comprising:

detection means receiving said data bit sets for determining the relative number of positive pulses transmitted compared to the number of negative pulses transmitted and providing an output representing the average level of the previously transmitted pulse sets;

pulse generator means for providing at least a first pulse in a first pulse period of the pulse set, a second pulse in a second pulse period of the pulse set and a third pulse having a duration equal to twice the period of the first pulse or the second pulse and beginning coincidentally with the first pulse and ending coincidentally with the second pulse;

pulse encoder means receiving said pulses from said pulse generator means and being responsive to said data bit sets and said output from said detection means for encoding each of said data bit sets into said pulse set;

transmitting means connected to a transmission medium and receiving said pulse sets from said pulse encoder means and transmitting said pulse sets at a given rate on said transmission medium;

receiver means connected to said transmission medium for receiving said transmitted pulse sets and being activated by a leading edge of each of said transmitted pulse sets; and converting said received pulse sets into said data bit sets based upon said fixed pulse width and independent of said rate at which said pulse sets are transmitted.

2. A digital communication system as set forth in claim 1 wherein said data sets comprise bit-pairs and said pulse sets comprise pulse-pairs.

3. A digital communication system as set forth in claim 1 wherein said transmitter is a.c. coupled to said transmission medium and said receiver means is a.c. coupled to said transmission medium.

4. A digital communication system for receiving data bit sets and encoding each bit set into a pulse set, the number of bits in each bit set being equal to or greater than the number of pulses in each pulse set and each of the pulses in a pulse set having a fixed width comprising:

detection means receiving said data bit sets for determining the relative number of positive pulses transmitted compared to the number of negative pulses transmitted and providing an output representing the average level of the previously transmitted pulse sets;

pulse generator means for providing at least a first pulse in a first pulse period of the pulse set, a second pulse in a second pulse period of the pulse set and a third pulse having a duration equal to twice the period of the first pulse or the second pulse and beginning coincidentally with the first pulse and ending coincidentally with the second pulse;

pulse encoder means receiving said pulses from said pulse generator means and being responsive to said data bit sets and said output from said detection means for encoding each of said data bit sets into said pulse set;

transmitter means connected to a transmission medium and receiving said pulse sets from said pulse encoder means and transmitting said pulse sets on said transmission medium;

receiver means connected to said transmission medium for receiving said transmitted pulse sets and being activated by a leading edge of each of said transmitted pulse sets;

means for sampling said received pulse sets at predetermined points in time and providing output signals representative of the polarity of the pulses of the pulse set; and means for receiving the output signals from said sampling means and for converting said output signals into said data bit sets.

5. A digital communication system as set forth in claim 4 wherein said data bit sets comprise bit-pairs and said pulse sets comprise pulse-pairs.

6. A digital communication system as set forth in claim 4 wherein said transmitter is a.c. coupled to said transmission medium and said receiver means is a.c. coupled to said transmission medium.

7. A method of encoding digital data in the form of a bit set in a pulse set, each pulse of said pulse set having a fixed width, and the number of bits in each bit set being equal to or greater than the number of pulses in each pulse set and transmitting said pulse set over a transmission medium to a receiver and converting said received pulse set into a bit set comprising the steps of:

receiving said data bit sets;

determining the relative number of positive pulses transmitted compared to the number of negative pulses transmitted;

generating an output having a negative, neutral or positive state representing the average level of previously transmitted pulses;

providing at least a first pulse in a first pulse period of said pulse set, a second pulse in a second pulse period of said pulse set and a third pulse having a duration equal to twice the period of said first pulse or said second pulse and beginning coincidentally with said first pulse and ending coincidentally with the second pulse;

encoding said data bit sets into said pulse sets upon receipt of said first, second and third pulses and in response to said output;

transmitting said pulse sets at a given rate over a transmission medium to a receiver;

activating said receiver for receiving said pulse sets upon receipt of the leading edge of a transmitted pulse set;

sampling said received pulse sets at predetermined points in time and providing output signals representative of the polarity of the pulses of said pulse set; and converting said output signals into said data bit sets based upon said fixed pulse width and independent of said rate at which said pulse sets are transmitted.

8. A method for digital communication as set forth in claim 7 wherein said data bits comprise bit-pairs and said pulse sets comprise pulse-pairs.

9. A digital communication method as set forth in claim 8 wherein said step of encoding comprises:

generating a pulse-pair having a negative polarity first pulse and a positive polarity second pulse when said data bit-pair is in the first state;

generating a pulse having a positive polarity when said data bit-pair is in a second state and said output is in the neutral or positive state;

generating a pulse having a positive polarity first and second pulse when said data bit-pair is in a second state and said output is in the negative state;

generating a pulse-pair having a positive polarity when said data bit-pair is in a third state and said output is in the neutral or negative state;

generating a pulse-pair having a first and second negative polarity pulse when said data bit-pair is in a third state and said output is in the positive state; and generating a pulse-pair having a first positive polarity pulse and a second negative polarity pulse when said data bit-pair is in a fourth state.

10. A method of encoding data bit-pairs into pulses and pulse-pairs, each pulse having a fixed width for use in a frequency-independent, high data transmission rate, self-clocking, d.c. balanced digital communication system which transmits said pulses and pulse pairs to a receiver for conversion back to data bit-pairs, said method comprising the steps of:

generating an output having a negative, neutral or positive state representing the average level of previously transmitted pulses;

generating a pulse-pair having a negative polarity first pulse and a positive polarity second pulse when said data bit-pair is in a first state;

generating a pulse having a positive polarity when said data bit-pair is in a second state and said output is in the neutral or positive state;

generating a pulse-pair having a positive polarity first and second pulse when said data bit-pair is in a second state and said output signal is in the negative state;

generating a pulse having a positive polarity when said data bit-pair is in a third state and the said output is in the neutral or negative state;

generating a pulse-pair having a first and second negative polarity pulse when said data bit-pair is in a third state and said output is in the positive state; and generating a pulse-pair having a first positive polarity pulse and a second negative polarity pulse when said data bit-pair is in a fourth state.

11. A frequency independent, high data transmission rate, self-clocking, d.c. balanced, digital communication system comprising:

means for receiving a plurality of data bit sets;

means for encoding said plurality of data bit sets into a plurality of pulse sets, the number of bits in each of said bit sets being equal to or greater than the number of pulses in each of said pulse sets, and each of the pulses in each of said pulse sets having a fixed width;

transmitter means connected to a transmission medium for communicating said pulse sets at a given rate, said pulse set being transmitted for each said bit set;

receiver means connected to said transmissions medium for receiving said transmitted pulse sets and being activated by the leading edge of a transmitted pulse set;

means for converting said received pulse sets into said data bit sets based upon said fixed pulse width and independent of said given rate;

detection means receiving said data bit sets for determining the relative number of positive pulses transmitted compared to the number of negative pulses transmitted and providing an output representing the average level of previously transmitted pulses;

a pulse generator means for providing at least a first pulse in a first pulse period of the pulse set, a second pulse in a second pulse period of the pulse set and a third pulse having a duration equal to twice the period of the first pulse or the second pulse and beginning coincidentally with the first pulse and ending coincidentally with the second pulse;

said encoding means receiving said pulses from said pulse generator means and being responsive to said data bit sets and said output from said detection means for encoding each said data bit set into a pulse set; and said means for converting comprises a means for sampling said received pulse sets at predetermined points and providing output signals representative of the polarity of the pulses of said pulse sets.

12. A digital communication system as set forth in claim 11 wherein said transmitter means is a.c. coupled to said transmission medium and said receiver means is a.c. coupled to said transmission means.

13. A frequency-independent, high-data transmission rate, self-clocking, d.c. balanced digital communication method comprising the steps of:

receiving a plurality of data bit-pairs;

determining the relative number of positive pulses transmitted compared to the number of negative pulses transmitted;

generating an output having a negative, neutral or positive state representing the average level of previously transmitted pulses;

encoding said data bit-pairs into pulses or pulse-pairs in response to said output, each of the pulses having a fixed width;

transmitting said pulses and pulse-pairs over a transmission medium, at a given rate, a pulse or pulse pair being transmitted for each bit pair;

activating a receiver for receiving said pulse or pulse-pair upon receipt of a leading edge of each of said transmitted pulse or pulse-pair;

converting said received pulses and pulse-pairs into data bit-pairs based upon said fixed pulse width and independent of said rate at which said pulses and pulse pairs are transmitted.

14. The digital communication method as set forth in claim 13 further comprising the steps of:

generating a first pulse in the first pulse period of said pulse-pair;

generating a second pulse in the second pulse period of said pulse-pair;

generating a third pulse having a duration equal to twice the period of said first pulse or said second pulse and beginning coincidentally with said first pulse and ending coincidentally with said second pulse.

15. The digital communication method as set forth in claim 14 wherein said step of encoding further comprises:

receiving said first, second and third generated pulses;

responding to said data bit pairs and said output having a negative, neutral and positive state;

generating a pulse-pair having a negative polarity first pulse and a positive polarity second pulse when said data bit-pair is in a first state;

generating a pulse having a positive polarity when said data bit-pair is in a second state and said output is in the neutral or positive state;

generating a pulse-pair having a positive polarity first and second pulse when said data bit pair is in a second state and said output is in the negative state;

generating a pulse having a positive polarity when said data bit-pair is in a third state and said output is in the neutral or negative state;

generating a pulse-pair having a first and second negative polarity pulse when said data bit-pair is in a third state and said output is in the positive state; and generating a pulse-pair having a first positive polarity pulse and a second negative polarity pulse when said data bit-pair is in a fourth state.

* * * * *